D. A. HOPKINS.
Car-Axle Box.
No. 203,150.                Patented April 30, 1878.
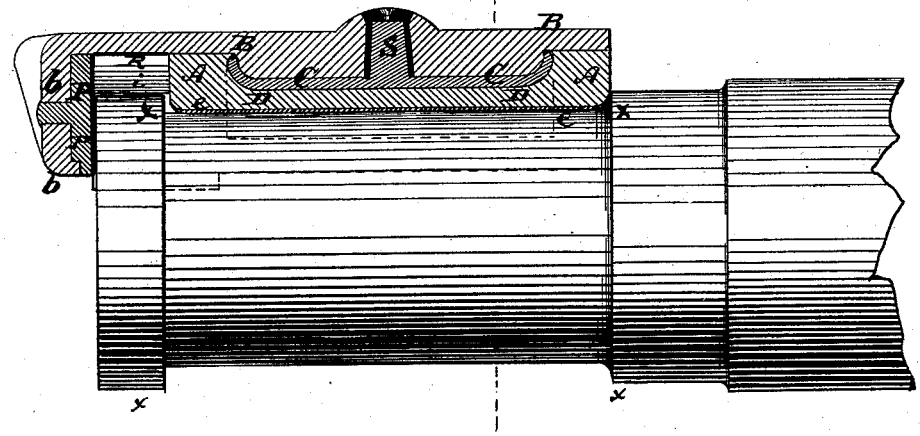
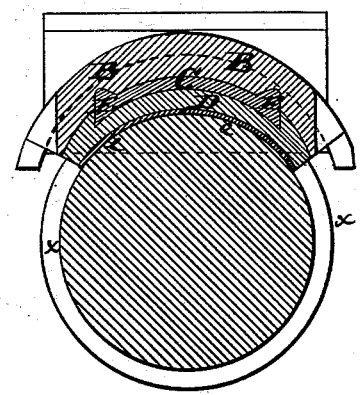
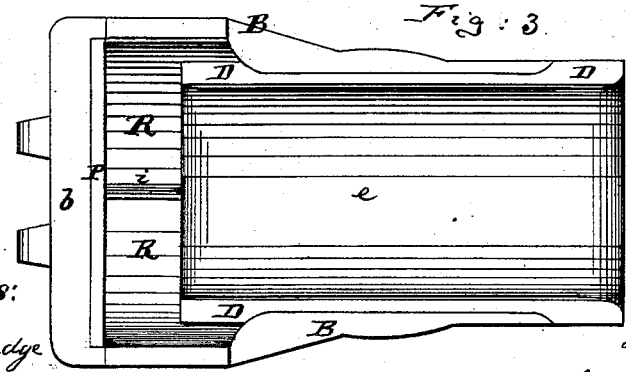
Witnesses:
John C. Tunbridge
D. Briesen
Inventor:
David A. Hopkins
by his attorney
A. v. Briesen

UNITED STATES PATENT OFFICE.

DAVID A. HOPKINS, OF PARK RIDGE, NEW JERSEY.

IMPROVEMENT IN CAR-AXLE BOXES.

Specification forming part of Letters Patent No. 203,150, dated April 30, 1878; application filed January 17, 1878.

*To all whom it may concern:*

Be it known that I, DAVID A. HOPKINS, of Park Ridge, county of Bergen, and State of New Jersey, have invented Improvements in Journal-Bearings and Stop-Bars for Railroad-Cars, of which the following is a specification:

This invention has for its object, first, the production of a combined journal-bearing and stop-bar, which are cast in one piece and detachable from the housing, suitable for use upon journals having collars on their outer ends, and used with journal boxes or housings, as now arranged and applied, for the reception of the load placed upon them and the disposition thereof to the journal; second, the production of a thoroughly-reliable journal-bearing and stop-bar at small expense; third, the perfect lubrication of the outer end of the journal-bearing and of the stop-bar; fourth, the production, at small cost, of a journal-bearing equally safe and more durable in use than a bronze bearing.

Said invention consists, first, in making said combined journal-bearing and stop-bar with a recess between them of suitable form, into which the outer collar of the journal enters and runs without receiving any considerable weight; second, in making said combined stop-bar and bearing, which are cast in one piece, with a thin bar or rib placed across said recess, and extending from bar to bearing, so as to bear upon said collar and intercept the passage of oil which accumulates on it when revolving, thereby causing the intercepted oil to flow from said rib down upon the end of the bearing, and upon the anti-friction metal at the end of the axle, thus insuring their proper lubrication; third, in making said combined journal-bearing and stop-bar of a load-carrying and thrust-sustaining part or back of iron or other strong and suitable material not intended for wear, with a strong pendent lip or flange thereof, for sustaining the end thrust of the axle, having its inner face lined with a suitable piece of anti-friction metal, secured thereto, for the wear of the end of the axle, while the under or journal side of said back is made of a suitable form for receiving and holding in place, while being worn, a plate of anti-friction metal, which is secured thereto, and which is properly formed to serve as a bearing for receiving the wear of the journal and its collars; fourth, in the combination, in a journal-bearing, of a back plate or load-carrying part, not intended for wear, made of iron or other suitable hard and strong material, with a thin piece of brass or bronze, to serve as a contingent bearing for the journal, and a suitable anti-friction plate, made of Babbitt metal, or any good and cheap anti-friction metal or alloy fusible in an iron ladle, and hard enough, when cold and when secured in said back, to carry its load without being crushed out of place, for usual wear of the journal and its collars, said back having its under or journal side made of the proper form for receiving and holding in place said piece of brass or bronze, which is made of proper form for the purposes indicated, while said anti-friction plate is made of the requisite form to constitute it a suitable bearing for receiving the wear of the journal and its collars, and to fit said contingent bearing and back, to which it is secured.

In the accompanying drawings similar letters of reference indicate corresponding parts in all the figures.

Figure 1 is a longitudinal vertical section of said journal-bearing and stop-bar, and rib or bar, as well as the recess between the stop-bar and outer end of the journal-bearing, divided at the center, and showing the various parts thereof and their relative position to each other and to the journal, with its collars, as well as the end of the axle or journal. Fig. 2 is a vertical transverse section of the same. Fig. 3 is an inverted plan view of said bearing, stop-bar, recess, and rib or bar crossing the recess.

B is the back plate or load-carrying part of said bearing, with its pendent lip or flange *b*, for sustaining the end thrust of the axle or journal, said back and lip being cast in one piece, but removable and separate from the housing of the journal-box. C is the contingent bearing, and is intended to prevent the journal from coming suddenly to said back in case of the anti-friction plate or principal wearing part of the bearing being heated and melted out, and is prevented from turning with the journal by having flanges E E, which enter and fit into corresponding grooves made therefor in said back, while it is held in place, for transportation and handling, by the spur S passing up through an opening provided therefor in said back, and being held in place by having lead cast around it, (the said spur.) D is the anti-friction plate for the principal wear of the journal, and is provided with flanges A A, for the wear of the collars x x of the journal. e e is the lining, made of lead or other suitably soft yielding metal or alloy, for receiving the journal when the bearing is first applied thereto. P is the plate, of anti-friction metal, for the wear of the end of the journal, and is secured to the sustaining-lip b by a bolt or rivet passing through both. R, Fig. 3, is a recess for receiving the collar of the journal, which runs therein. i is the thin bar crossing said recess, and extending from the stop-bar to the bearing. Said rib bears upon the collar of the journal, for the purpose of intercepting the oil accumulating thereon when revolving, and distributing it to the outer end of the journal-bearing and to the anti-friction plate P, for the purpose of insuring their proper lubrication.

The concave form of the journal side of said load-carrying back, as shown in the accompanying drawings, is preferable, because of admitting of greater economy in amount of the more expensive metal of which the contingent bearing is made and of the greater strength left in said back, but is not necessary to the successful use of the bearing as a whole.

The soft-metal lining of the anti-friction plate for the principal wear of the journal may be cast partly in a recess therefor in said anti-friction plate, as sometimes practiced in the use of the Babbitt metal, care being taken, however, that it shall project beyond the surrounding harder metal, for the purpose of receiving the first bearing of the journal. It may also be used in the form of sheet-lead, in which case, however, it is liable to cause heating by becoming displaced when worn through along the middle.

The best results from the use of said soft-metal lining are obtained when it is secured in place substantially as shown and described in Letters Patent of the United States granted to me and dated November 15, 1870. The anti-friction parts of said bearing and stop-bar are, when worn out, to be replaced by parts of like form and nature, thus making the bearing as good as when all new at very small cost.

In case of a bearing being so made as to cause any considerable part of its weight to be received upon the collar of the journal and placed in a journal-box and upon a journal, as now arranged and used, the displacement of the load-center affected thereby would render its use impracticable.

The journal-bearing herein shown and described differs greatly from that for which Letters Patent of the United States were granted to me dated March 11, 1862, by giving equal safety in use, with greater durability, at a great reduction in cost, with certainty of running cool from the first.

In the manufacture of said bearing and stop-bar, I proceed as follows: I first make said back, with its pendent lip b, as above shown; then make said contingent bearing-plate, place it in a frame or mold made therefor, and cast the plate for the principal wear of the journal around it, as shown. I then take the anti-friction plate for the end wear of the axle, previously cast, with the bar i attached to it, and secure it to said lip, as shown. I then secure the anti-friction parts of the journal-bearing to said back, as herein described, with the said soft lining attached thereto or placed in position at the time of applying the bearing to the journal.

I claim as my invention in this case—

1. In a journal-bearing, the removable load-carrying plate B, cast in one piece with the removable stop-bar b, so as to form a recess, R, for the reception of the collar of the journal, said recess being of such depth that the collar cannot reach to the top thereof, substantially as specified.

2. The rigid rib i, placed across the recess R, and extending from the bearing to the stop-bar, substantially as and for the purpose stated.

3. In a journal-bearing, the combination of the outer back plate B with the contingent wearing-plate C and main wearing-plate D, substantially as herein shown and described.

4. In a journal-bearing, the back plate B, cast in one piece with the removable stop-bar, and combined with the contingent wearing-plate C and main wearing-plate D, substantially as herein shown and described.

DAVID A. HOPKINS.

Witnesses:
T. B. MOSHER,
JOHN C. TUNBRIDGE.